United States Patent
Ehm et al.

[15] 3,685,378
[45] Aug. 22, 1972

[54] APPARATUS FOR THE CUTTING OF ELONGATED MEMBERS

[72] Inventors: Karl Ehm, Pfalzerweg 12a; Hermann Vollmecke, both of 4330 Mulheim/Ruhr, Germany

[73] Assignee: said Ehm by said Vollmecke

[22] Filed: Sept. 28, 1970

[21] Appl. No.: 76,010

[52] U.S. Cl. .................................................83/411
[51] Int. Cl. ...............................................B26d 7/06
[58] Field of Search.................83/199, 200, 411, 470

[56] References Cited
UNITED STATES PATENTS
3,443,610   5/1969   Eriksson......................83/411
3,538,802   11/1970  Helm..........................83/411

Primary Examiner—Andrew R. Juhasz
Assistant Examiner—David R. Melton
Attorney—Karl F. Ross

[57] ABSTRACT

Elongated members, e.g., pipes arriving in succession upon transport device, are subdivided longitudinally at a cutting station by being entrained along a rotary (circular) path intersected by the path of a sawblade, the center of rotation of which lies within the periphery of the circular path but which intersects the latter. The elongated members are retained by clamping devices while they engage the sawblade, the clamping devices releasing the severed portions for further displacement away from the cutting station.

6 Claims, 7 Drawing Figures

Karl Ehm
Hermann Völlmecke
INVENTORS.

By

Karl F. Ross
Attorney

Karl Ehm
Hermann Völlmecke
INVENTORS.

BY Karl F. Ross
Attorney

3,685,378

APPARATUS FOR THE CUTTING OF ELONGATED MEMBERS

FIELD OF THE INVENTION

My present invention relates to a method and apparatus for the severing, subdivision, cutting and separation of elongated members, preferably rectilinear bodies in the longitudinal sense during their movement through a subdividing station and, more particularly, to a system for cutting pipe, tubes, rods, bars and like rectilinear bodies at one or more locations along the length thereof to form individual portions.

BACKGROUND OF THE INVENTION

Relatively long bodies of rectilinear configuration and a relatively small width and thickness, but relatively large length, have been made by various techniques in such fashion that further longitudinal subdivision of the bodies is required. Such bodies may have circular or noncircular cross sections, may have hollow or solid sections, and may be completely closed (continuous periphery) or may be slotted. The bodies may be made of wood, synthetic resin, metal or other composition and may be produced by extrusion, rolling, casting, drawing, spinning or the like. Such bodies have, however, several characteristics in common. Firstly, they are of substantially uniform outline over their entire length, are relatively rigid and capable of withstanding radial compressive forces, and are of a material which can be cut by an appropriate blade. Cutting or sawblades for such bodies have been composed of abrasive materials or provided with teeth.

Such bodies may arrive from a stockpile or a manufacturing plant in succession, i.e., upon a conveyor means, arranged in parallel relationship, i.e., the bodies are advanced in a direction perpendicular to their major or longitudinal dimension, in transversely spaced, parallel relationship, and are thus carried to a subdividing station. While subdivision has been performed by hand, with the aid of bandsaws, circular saws and the like, the movement of the bodies has generally enabled only several, frequently but one, bodies or body to engage the saw at any one time. Hence the cutting procedure is relatively slow.

In an effort to improve the rate at which such bodies can be longitudinally subdivided, it has been proposed to provide a carrier for the individual workpieces in the form of wheels lying in planes perpendicular to the direction of advance of the elongated bodies and to the axes of the latter, and rotatable about an axis parallel to the bodies, while being provided on their peripheries with means for engaging the bodies and retaining them along generatrices of a substantially circular path of such transport means. A sawblade or cutting disk has a segment of its arc extending within this circular path so that the rods, bars and other elongated members are carried one after another into the region of the sawblade and are there severed.

To retain the bodies against movement during the cutting operation, counterwheels are provided in juxtaposition with the transport wheels so that the bodies are retained between the wheels in the region in which they engage the sawblade. Since, however, only one or two bodies can be retained by the counterrotating clamping and transport wheels, and the cutting operation can only be performed on these clamp members, the apparatus does not materially increase the speed at which the cutting operation can be performed, although the cutting station may thereby be rendered more compact.

A further disadvantage of this prior art system resides in the fact that the counterrotating wheels serving as the clamping means makes it difficult to drop the severed portions of the elongated members from their clamped position and hence relatively complicated devices have been provided to permit swinging of the counter wheels or clamping wheels out of the clamping position. This interrupts the cutting process and breaks the continuity thereof.

OBJECTS OF THE INVENTION

It is, therefore, the principal object of the present invention to provide an improved system subdividing elongated workpieces and particularly a succession thereof arriving upon a conveyor or the like in a direction generally transverse to their major dimensions and substantially parallel to one another.

It is another object of this invention to provide an apparatus subdividing elongated workpieces in which the disadvantages of the earlier systems mentioned above are obviated.

It is still another object of my invention to provide a system subdividing elongated workpieces which can be practiced in a limited space, provides a high throughput and requires relatively simple apparatus.

More specifically, it is an object of this invention to provide an apparatus for cutting, severing or subdividing a succession of elongated workpieces wherein the discharge of the severed portions from the cutting zone does not interrupt the continuity of the process.

It is a further object of my invention to provide an apparatus of the character described which is relatively simple and inexpensive.

SUMMARY OF THE INVENTION

These objects and others which will become apparent hereinafter, are attained, in accordance with the present invention, in a system for the subdivision of a succession or multiplicity of workpieces, generally rectilinear rods, bars, tubes or the like, with round or polygonal configuration, by cutting them transversely to their major dimensions and to their axes with the aid of a sawblade, cutting blade or other subdividing blade means rotatable about an axis parallel to the workpieces and perpendicular to the direction of displacement thereof, a plurality of workpieces being carried along a circular transport path into engagement with the cutting blade, the transport path being intersected by the cutting blade over an arc thereof (preferably of approximately half of the arc length of the transport path), the axis of the saw lying within the periphery of the transport path so that the saw arc and the transport-path arc in the cutting zone are radially offset (eccentric) with respect to one another.

According to an important feature of the present invention, the transport means includes a pair of disks or wheels spaced on opposite sides of the sawblade and provided along their peripheries with angularly spaced clamping devices which releasably engage the elongated bodies. At one point along the circular transport path, these devices clamp the bodies on the wheels as the wheels rotate toward the intersection of the transport path with the circular arc of the sawblade, and retain the bodies against movement in the axial or radial directions and against rotation about the axis of the body, during the cutting operation. The clamping means, according to the present invention, may comprise a hook-shaped member having a surface lying outwardly from an inner periphery of the transport wheel and defining an anvil while the periphery of the wheel is formed with a movable member which is radially shiftable and clamps the workpiece against the anvil. The anvil and the clamping member together preferably constitute a structure extending over at least 180° of the periphery of the workpiece and, advantageously, somewhat more than a semi-circumference thereof.

According to the apparatus aspects of the invention, the clamping devices are angularly equispaced about the periphery of the transport wheels and the clamping members are driven synchronously with the rotation of the wheel so that they release the severed portions of the workpiece at the discharge side of the cutting arc as each clamping device reaches this point and engage a fresh workpiece ahead of the cutting arc as the anvil members pick up the workpiece from the conveyor means.

It is important to the present invention that the axis of the sawblade will lie wholly within the periphery of the transport wheels and, advantageously, wholly within the circular arc defined by the innermost portion of the clamping wheel. According to a feature of this invention, the axis of rotation of the circular saw, which preferably rotates in a sense opposite that of the transport means, is located close to the axis of the circular transport path and has a diameter approximately equal to the diameter of the transport path as measured at the axes of the workpieces displaced thereby. The offset of the axis of the saw from the axis of the transport path is, however, in the direction of the discharge position of the workpiece and the clamping means are provided with openings oriented downwardly in the cutting and discharge positions. The diameter of the sawblade, in the optimum case is smaller by one workpiece diameter than the diameter of the transport path as described by the outermost portion of the workpiece and the centerpoint of the sawblade is offset from the axis of the transport path by half of the workpiece diameter in the direction of the discharge station. These distances, with reasonable tolerances, permit complete severing of the workpiece and, moreover, compensation for workpieces of slightly varying width.

It will be apparent that the aforedescribed apparatus may bring a large number of elongated workpieces into engagement with a sawblade or cutting disk so that a large number of individual cutting operations can proceed progressively at any one time. The overlap of the circular rods of the transport path and the sawblade ensures a progressive cutting operation so that binding of the saw is minimized. Finally, since the claw-type clamping arrangement provides an anvil which is located outwardly of the sawblade and supports the workpiece along its surface opposite that engaged by the sawblade during commencement and progress of the cutting operation, the movable clamping member is never stressed by the sawing pressure.

Still another feature of this invention resides in the use of a sawblade of the segmental type, i.e., wherein blade segments are clamped to a hub or like structure so as to be replaceable thereon.

The above and other objects, features and advantages of the present invention will become more readily apparent from the following description, reference being made to the accompanying drawing in which:

FIG. 1 is a side-elevational view of the apparatus for longitudinally subdividing a succession of workpieces according to the principles of the present invention;

FIGS. 2, 3, and 4 are diagrams illustrating the progress of the sawing operation;

SPECIFIC DESCRIPTION

Figure 1:
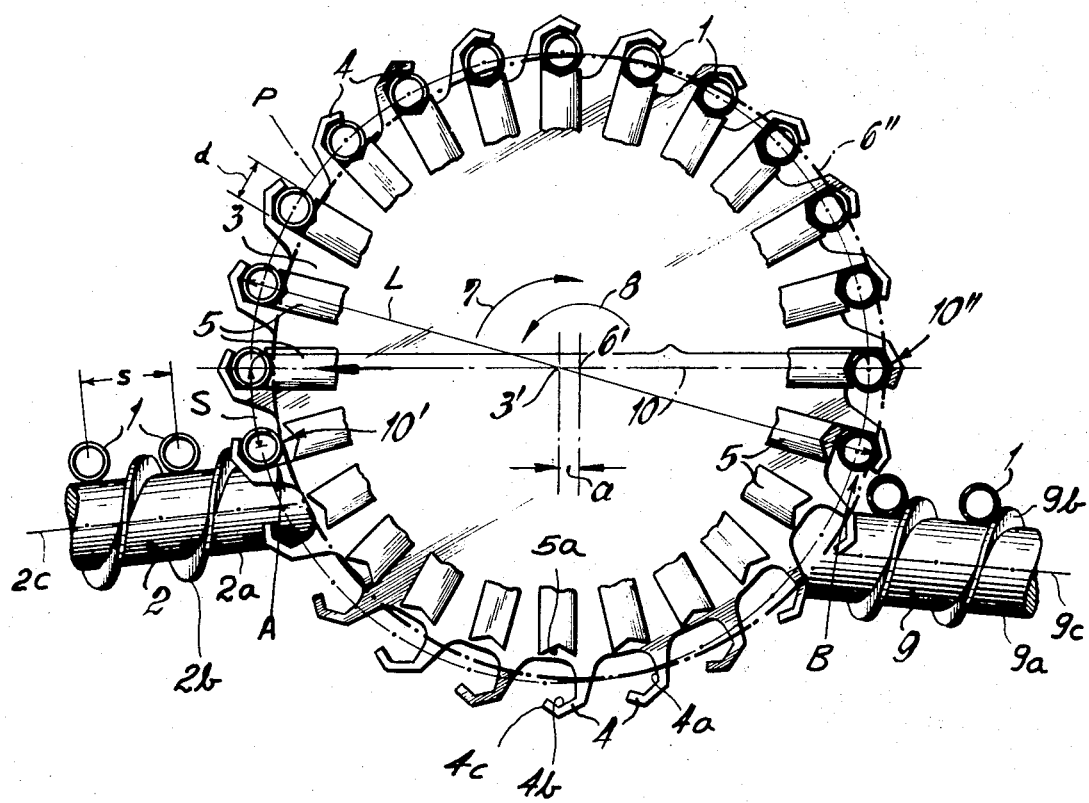
Figure 6:
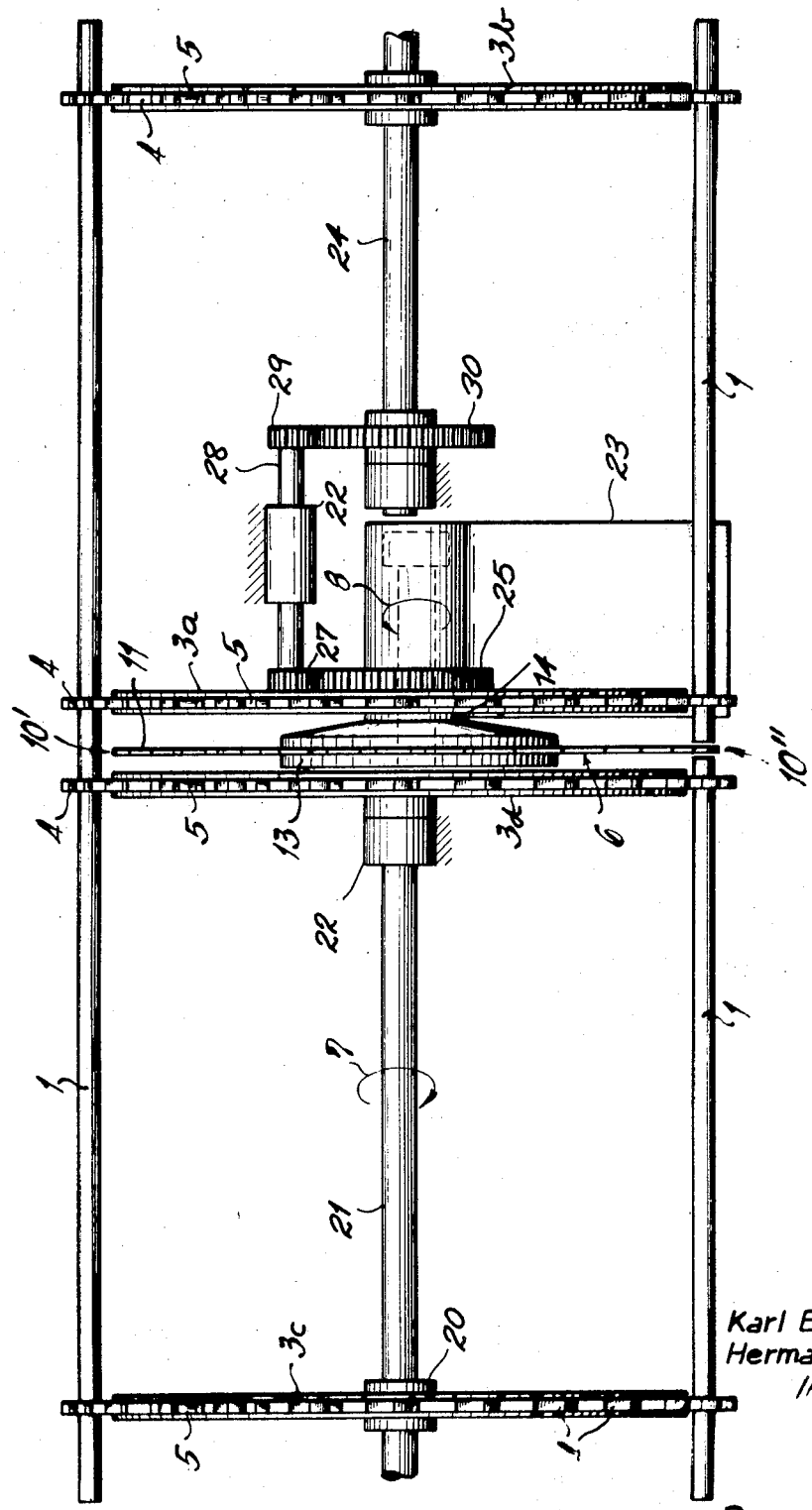
FIG. 6 is a plan view of the apparatus.
Figure 7:
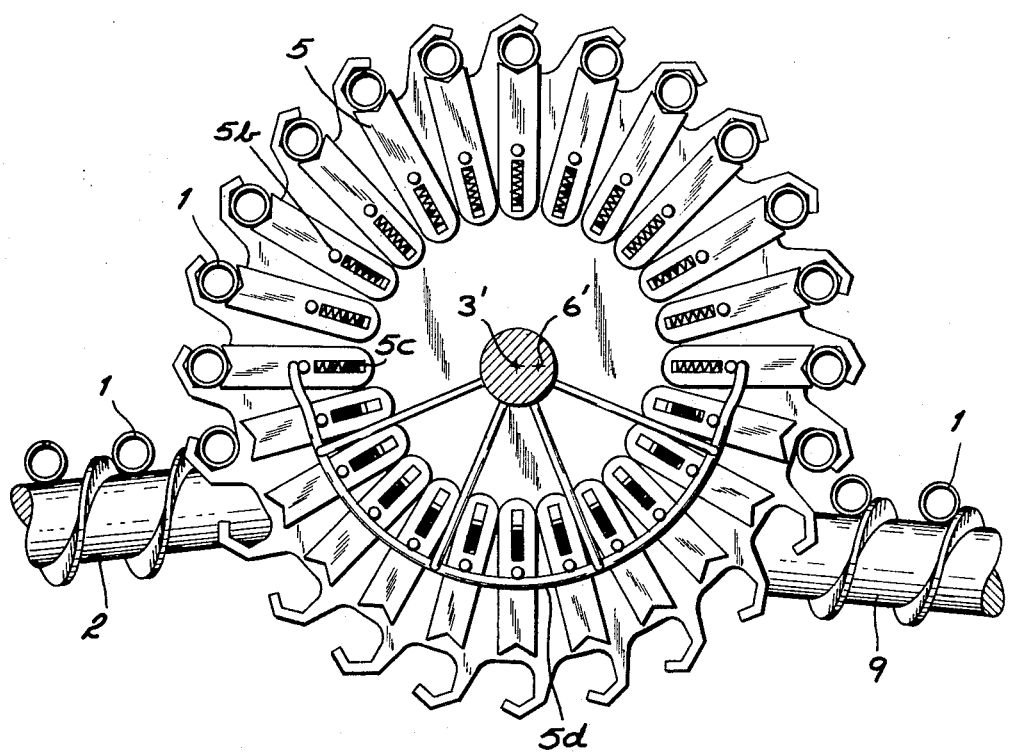
FIG. 7 is a view similar to FIG. 1 illustrating certain features of the device in greater detail.

In FIGS. 1, 6, and 7 of the drawing, I show an apparatus for the separation of a succession of tubular workpieces 1 which arrive upon a conveyor generally designated at 2. The conveyor 2 may consist of a pair of worms (one shown at 2a) which are horizontally spaced apart and parallel to one another while being located between pairs of transport disks 3a, 3b, and 3c and 3d, the disks being generally represented at 3, in FIG. 1. The worms 2a are rotated synchronously and are provided with helical ribs 2b, between which the tubes 1 are advanced with a spacing s approximately equal to the spacing between clamping devices upon the periphery of the disks 3, 3a–3d as represented by the dimension S in FIG. 1.

The disks 3c and 3d are mounted via hubs 20 upon a shaft 21 rotatably supported at a journal 22 and defining an axis 3' of the circular transport path of the rods. The disk 3d closely flanks a sawblade represented generally at 11 and held between the flanges 13 of a hub 14. The sawblade is rotatably mounted upon a support 23 so that its axis 6' is offset by a distance a from the axis 3'. The workpiece-transport mechanism is rotated in the clockwise sense (FIG. 1) as represented by arrow 7 while the sawblade 6, 11 is rotated in the opposite sense (counterclockwise) as represented by the arrow 8.

Coaxial with the shaft 21, I have provided a shaft 24 on the opposite side of the sawblade 6, 11, which carries the transport disk or wheel 3b and which is rotatable about the axis 3' mentioned earlier. The right- and left-hand ends of shafts 24 and 21, respecrively, are coupled to a drive which may be synchronized with that of the conveyors 2 and 9. The inner disk 3a at the right-hand side of the sawblade 6, 11, is mounted coaxially with the shafts 21 and 24 on the housing 25 and is coupled with shaft 24 via a driven gear 26 coupled with the hub of this disk. A pinion 27 meshes with gear 26 and is journaled on the support 22 at a location offset from the axis 3' to clear the saw-driving means represented generally at 23. The shaft 28 of this pinion 27 is driven by a gear 29 in mesh with the gear 30 carried by the shaft 24. At the discharge side of the apparatus, there is provided a further conveyor arrangement 9 with four conveyor worms 9a having helical ribs 9b as described with respect to conveyor 2. The axis of the conveyor 2, represented at 2c is shown to be inclined upwardly in the direction of the sawblade with respect to the horizontal and defines at A a takeup station for the elongated workpieces. At the opposite side of the sawblade, the conveyor 9 has its axis 9c inclined downwardly with respect to the horizontal to facilitate removal of the cut workpieces from the discharge station. The disks 3, 3a–3d and the sawblade 6 are shiftable along the respective axis to adjust the lengths of the portions.

The horizontal diameter 10 of the disk is coplanar with the axes 3' and 6' and lies above the pickup station A at the left-hand side of the blade and the discharge station B at the right-hand (downstream) side thereof. The disks 3, 3a–3d, therefore, define a circular transport path with a diameter D as measured between centers of the workpieces in their clamp condition.

Along the peripheries of the transport disks 3, I provide a multiplicity of angularly equispaced claw-like outer clamping elements 4, best seen in FIG. 1, and defining the anvils mentioned earlier. These outer clamping elements or retaining elements 4 are open in the sense of rotation of the disks 3 to receive the workpieces 1 as these elements swing upwardly below the workpieces retained upon the conveyor worms 2a. As illustrated in FIG. 1, each of the outer elements 4 has a radial surface 4a which is substantially horizontal as the elements sweep past the diameter 10, and V-shaped surfaces 4b which converge outwardly and are formed on a dogleg 4c to reach behind the workpieces. Juxtaposed with the surfaces 4b is a movable clamping shoe 5 which, in its pickup position 10' is located radially inwardly but is shiftable radially outwardly to lock the workpieces in place.

The members 5 are withdrawn as shown at 10'' at the discharge side to release the workpieces. The other portion of the clamp is the radially shiftable member 5 whose surfaces 5a confronting the surfaces 4b also converge, but inwardly so that the body is held between a pair of V-shaped clamping members.

While substantially any camming or actuating arrangement may be employed to shift the clamping members 5, I have shown in FIG. 7 an arrangement suitable for this purpose. Each of the clamping members 5 is here shown to be provided with a pin 5b and to be urged outwardly by a heavy spring 5c so that, in the absence of restraint, the members 5 retain the workpieces 1 against the anvils 4.

However, the lower portion of the path of each disk 3 between the discharge station B and the pickup station A, is provided with a camming bar 5d of a radius of curvature exceeding that of the arc described by the pins 5b in their normal or unconstrained position and centered upon an axis located above the axis of the disk 3. Consequently, each pin 5b is intercepted by the bar 5d as it swings into the discharge position and is cammed radially inwardly to open the respective clamps and release the workpiece 1. On the upswing through the pickup station, the anvil 4c, having a hook-shaped configuration as noted earlier, engages the uncut workpiece 1 and the corresponding pin 5b is released from the bar 5d so that the spring 5c drives the respective member 5 against the workpiece to retain the latter during the cutting operation.

As also noted earlier, the arrow 7 represents the direction of movement of the workpieces along the circular path represented by the dot-dash line P about the axis 3', while the arrow 8 represents the counter rotation of the sawblade about the axis 6' so that its periphery 6'' of teeth (represented by the heavy broken line in FIG. 1) intercepts the path P at the top of the latter. However, the circle described by the inner surface of the workpieces 1 intercepts the path of the sawblade as each workpiece crosses the axis 10 and each circle described by the outermost surface of the workpiece intercepts the sawblade path at 10'' on the opposite side, i.e., 180° offset from the commencement of the sawing operation. The diameter of the circle 6'' and, therefore, of the circular saw 6, is about one workpiece diameter d less than the diameter L of the circle described by the outermost portions of the workpieces. Hence L = D + d and D also represents the diameter of the circular saw. The axis 6' of the circular saw is offset by a distance $a = d/2$ from the axis 3' along the diameter 10 in the direction of the discharge side B of the device. Since the diameter of the workpiece may be varied in accordance with different sawing progress, it is merely necessary to provide a clamping arrangement of sufficient size to accommodate the largest such workpiece and provide a displacement of members 5 sufficient to engage the workpiece, and further to employ means for adjusting the distance $a$ between the centers 3' and 6' correspondingly.

Figure 2:
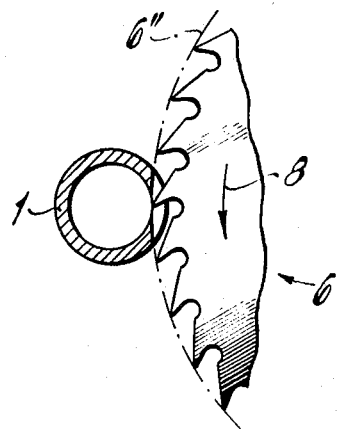
Figure 3:
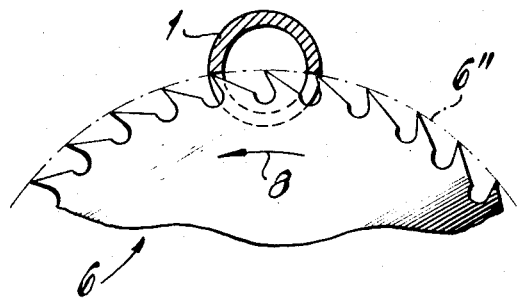
Figure 4:
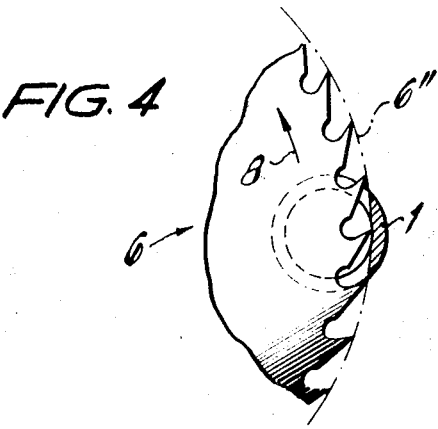

In FIGS. 2–4, I show the commencement of cutting, an intermediate stage and the final stage which are accomplished by the apparatus illustrated in FIGS. 1, 6, and 7. As an example for the change in the distance between the centerpoint 6' of the circular saw and the centerpoint 3' of the transport path, there is provided a table illustrative of the various relationships. Unless otherwise indicated, the dimensions given in the table are in millimeters.

In the table:

DA represents the outer diameter of the transport path,
DW the outer diameter of the workpiece,
DK the circular sawing diameter,
E the distance between points 3' and 6',
SP the distance between the periphery and the saw and the workpiece at the takeup side A, and
L represents the portion of the saw periphery which extends beyond the saw-through workpiece.

|    | DA   | DW   | DK   | E  | SP  | L |
|----|------|------|------|----|-----|---|
| 1. | 1700 | 60   | 1640 | 32 | 2   | 2 |
| 2. | 1700 | 66   | 1640 | 38 | 2   | 8 |
| 3. | 1700 | 54   | 1640 | 32 | 8   | 2 |
| 4. | 1700 | 60.3 | 1640 | 32 | 1.7 | 2 |
| 5. | 1700 | 57   | 1640 | 32 | 5   | 2 |
| 6. | 1700 | 63,5 | 1640 | 35 | 1.5 | 5 |

Figure 5:
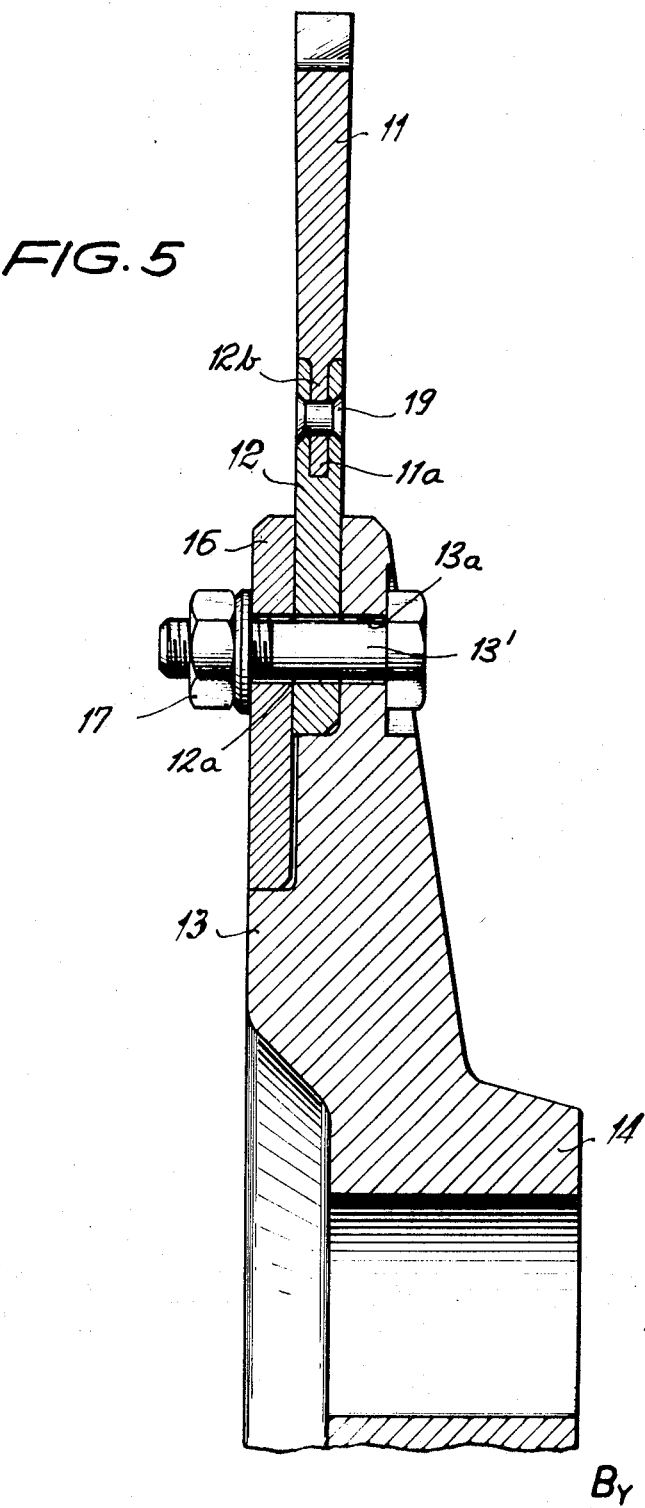
FIG. 5 is an axial cross section through a segmented sawing blade of the type used in the apparatus of FIG. 1.

FIG. 5 illustrates an embodiment of the circular saw of the present invention which comprises a flange 13 carried by the hub 14 and, in turn, provided with a disk-shaped blade base 12. The latter is retained in place by bolts 13' extending through a bore 13a formed in the flange 13 at angularly equispaced locations thereabout. The bolts 13' also pass through an appropriate opening 12a formed in the ring 12 and thence through a clamping ring 16 to which it is held by a nut 17. The ring 12, in turn, supports the sawblade segments 11 which are fixed by tongues 11a in grooves 12b and held in place by transfixing rivets 19. The offset arrangement of the axes of the transport path and the sawblade also ensures that the bight of the sawing into the workpiece will occur at a low rate initially, proceed at a high rate at an intermediate stage of the cut and terminate at a low rate to provide a neat and smooth separation. Furthermore, since the clamping means is always juxtaposed with the sawing blade and the direction of feed of the latter into the workpiece, the major portion of distress arising from the sawing operation is taken up by the anvil.

A number of saws can, of course, be provided and we prefer to employ a pair of support and transport disks between each pair of saws when more than one is used. It has also been found to be advantageous to drive the transport means and sawing blade independently from one another, e.g., by connecting them with an infinitely variable adjustable transmission or a step drive.

The improvement described and illustrated is believed to admit of many modifications within the ability of persons skilled in the art, all such modifications being considered within the spirit and scope of the invention except as limited by the appended claims.

I claim:

1. An apparatus for subdividing a succession of elongated workpieces, comprising transport means including a pair of spaced-apart transport disks rotatable about a common axis and formed along their peripheries with means for entraining said workpieces along a transport path corresponding to a circular arc centered upon said axis, at least one cutting disk rotatable about an axis lying within said path and offset from the axis thereof while intersecting said path to an extent corresponding at least to the thickness of the workpieces entrained along said path.

2. The apparatus defined in claim 1 wherein said cutting disk has a diameter which is less than the diameter of the circular arc described by the outermost portion of said workpieces entrained along said path by about one thickness of the workpiece and the said axes are offset in the downstream direction of movement of said workpieces by about half said thicknesses.

3. The apparatus defined in claim 2 wherein each of said transport disks is provided along its periphery with a plurality of angularly equispaced claw-shaped retaining members, open in the direction of rotation of said disks and retaining said workpieces against outward movement relative to said transport disks and clamping means radially movable on said transport disks for engagement with said workpieces.

4. The apparatus defined in claim 2, further comprising means for adjusting the distance between said axes.

5. The apparatus defined in claim 2, further comprising means for adjustably shifting said transport and cutting disks along their respective axes.

6. The apparatus defined in claim 2 wherein said cutting disk is a circular saw having segmented blade portions.

* * * * *